United States Patent
Li et al.

(10) Patent No.: US 7,521,112 B2
(45) Date of Patent: Apr. 21, 2009

(54) COATED ART MATERIAL SYSTEM

(75) Inventors: Jie Li, Allentown, PA (US); Cheryl Krieger, Bangor, PA (US); Arthur N. Urbanski, Bangor, PA (US); Craig Skinner, Easton, PA (US); Karl Guyler, Bucyrus, KS (US); Stephen D. Glasscock, Overland Park, KS (US)

(73) Assignee: Crayola LLC, Easton, PA (US)

( * ) Notice: Subject to any disclaimer, the term of this patent is extended or adjusted under 35 U.S.C. 154(b) by 632 days.

(21) Appl. No.: 10/880,264

(22) Filed: Jun. 29, 2004

(65) Prior Publication Data

US 2005/0287356 A1    Dec. 29, 2005

(51) Int. Cl.
*B32B 5/66* (2006.01)

(52) U.S. Cl. .............. 428/195; 428/199; 428/203; 428/207; 428/423.1

(58) Field of Classification Search ................ 428/195, 428/199, 203, 207, 423.1
See application file for complete search history.

(56) References Cited

U.S. PATENT DOCUMENTS

| | | | |
|---|---|---|---|
| 4,139,965 A | 2/1979 | Curry et al. | |
| 4,252,845 A | 2/1981 | Griffiths et al. | |
| 4,557,618 A | 12/1985 | Iwata et al. | |
| 4,681,471 A * | 7/1987 | Hayduchok et al. | ........... 401/34 |
| 4,787,852 A | 11/1988 | Melnick | |
| 4,988,123 A | 1/1991 | Lin et al. | |
| 5,006,171 A | 4/1991 | Mecke et al. | |
| 5,288,160 A * | 2/1994 | Li et al. | ................... 401/198 |
| 5,427,278 A | 6/1995 | Gardner, III | |
| 5,486,228 A | 1/1996 | Miller et al. | |
| 5,492,558 A | 2/1996 | Miller et al. | |
| 5,649,999 A | 7/1997 | Wang | |
| 5,788,501 A | 8/1998 | Hassall | |
| 6,221,432 B1 | 4/2001 | Wang et al. | |

FOREIGN PATENT DOCUMENTS

| | | |
|---|---|---|
| DE | 2724820 A1 | 12/1978 |
| EP | 0584571 A | 3/1994 |
| EP | 0584571 A2 * | 3/1994 |
| GB | 1420495 A | 1/1976 |

OTHER PUBLICATIONS

Int'l Search Report for PCT/US2005/021271 dated Aug. 5, 2006.
ASTM Designation: D 2805-88 entitled "Standard Test Method for Hiding Power of Paints by Reflectometry", dated 1992.

* cited by examiner

*Primary Examiner*—Leszek Kiliman
(74) *Attorney, Agent, or Firm*—RatnerPrestia

(57) ABSTRACT

The present invention is a system for hiding and later revealing a hidden layer. The system includes a substrate and applicator. As the user moves the applicator around the substrate, a coating is rendered transparent to reveal a hidden layer under the pattern of the user's movement of the applicator. The system comprises a substrate at least partially coated with a generally opaque coating that reacts with an eradicator fluid. A preferred coating as applied to the substrate comprises 20-80 wt % water, 0-3 wt % defoamer, 0-3 wt % surfactant, 0-5 wt % wetting agent, 1-25 wt % colorant, 1-60 wt % resin, and 0-4 wt % preservatives. A preferred reducing fluid in such case comprises 30-95 wt % water, 1-5 wt % pH adjuster, 5-15 wt % reducing agent, 0-5 wt % surfactant, and 2-10 wt % buffer.

31 Claims, 2 Drawing Sheets

COATED ART MATERIAL SYSTEM

FIELD OF THE INVENTION

The present invention relates to coated substrates, and more particularly to a system where a coating can be chemically reacted to reveal what is on a substrate by applying an eradicator fluid to the coating.

BACKGROUND OF THE INVENTION

Many craft or art systems are available that are directed to children. One such system has involved providing a kit of markers whereby all but one of the markers in the kit contains a different colored ink. The last marker in such a kit contains an eradicator ink fluid, which is generally clear, that can be applied over top of the colored ink laid down by any of the colored markers in the kit to thereby react with the colored ink and render it colorless. This chemistry is disclosed, for example, in U.S. Pat. No. 4,681,471. The '471 patent provides a marker having a dye-based ink which is applied to a surface by the user and can be later eradicated by application of a reducing agent such as sodium metabisulfite. A drawback of this technology, however, is that a child is still able to make marks anywhere with the colored markers in such a system.

Another type of art system is known in the art as scratch art. Here, a wax, ink, or paint coating is applied to a surface, which coating can be later mechanically removed by a user to reveal a layer underneath. Often the layer underneath would have some type of design or coloring which the user reveals by scratching away the cover layer. In such a case, a sharp implement such as a knife or wooden scraper or stylus is needed to physically remove the coating. Such implements raise safety issues, especially with children, who are often the users of such craft systems. These system also are generally messy as they produce shavings and residue.

SUMMARY OF THE INVENTION

The present invention provides a system having a hidden image or layer which can later be viewed by a user through the application of an eradicator fluid to a cover layer or coating disposed atop the hidden layer. One embodiment of the present invention includes use of the invention in a craft or art project intended primarily for use by parents, teachers, and children. Such an exemplary system includes a substrate coated with a generally opaque coating and an eradicator fluid applicator. The applicator is preferably in the form of a marker which the user applies to the coated substrate. As the user moves the applicator around on the coated substrate, the eradicator fluid reacts with the coating, specifically the dye in the coating, to reveal what is underneath the coating. By having a chemical means to reveal images and patterns, the invention makes it easy for children to use the product without the safety and/or mess concerns of the existing art materials.

That which is revealed is defined by the pattern of the user's movement of the applicator (e.g., marker). This effect is caused by a chemical reaction between the coating and the eradicator fluid. The coating is changed from a generally opaque layer to a transparent, colorless layer, thereby revealing what was theretofore hidden below the coating. Preferably, a colored design or single colored layer, which may itself be later drawn upon, is revealed underneath the coating. The coating itself may be any color, so long as it is generally opaque so as to hide that which is below the coating prior to the eradicator fluid being applied by the user. The eradicator fluid contains a reducing agent that reacts with the dye in the coating. The dye in the coating is selected such that its coloring ability is destroyed in the presence of a reducing agent.

A system according to the present invention comprises a substrate at least partially coated with a reactive coating that reacts with a reducing fluid. A suitable coating for application to the substrate comprises 20-80 wt % solvent, preferably water, 0-3 wt % defoamer, 0-3 wt % surfactant, 0-5 wt % wetting agent, 1-25 wt % colorant(s), 1-60 wt % resin, and 0-4 wt % preservatives. The coating, when dry, comprises 0-3 wt % defoamer, 0-3 wt % surfactant, 0-10 wt % wetting agent, 1-80 wt % suitable colorant(s), 10-90 wt % suitable resin, and 0-4 wt % preservatives.

A preferred reducing fluid comprises 30-95 wt % water, 1-5 wt % pH adjuster, 5-15 wt % reducing agent, 0-5 wt % surfactant, and 2-10 wt % buffer/co-reducing agent.

Optional additional layers may be placed between the hidden layer and coating layer, and/or on top of the coating layer to prevent smudging or inadvertent removal of the coating layer onto the user's fingers or clothes.

A preferred system according to the present invention comprises a writing surface comprised of a substrate or surface, a colored layer disposed on at least one side of the substrate or surface, and a generally opaque coating disposed atop the colored layer. As above, the coating layer is comprised of a composition that is chemically reactive with an eradicator fluid whereby the coating is not removed, but becomes transparent after reaction with the eradicator fluid to thereby reveal the hidden layer underneath.

BRIEF DESCRIPTION OF THE DRAWINGS

The features of the invention believed to be novel and the elements characteristic of the invention are set forth with particularity in the appended claims. The figures are for illustration purposes only and are not necessarily drawn to scale. The invention itself, however, may best be understood by reference to the detailed description which follows taken in conjunction with the accompanying drawing in which:

DETAILED DESCRIPTION OF THE INVENTION

In its most general embodiment, the present invention provides a substrate or surface which may be a single color or a colored design, and a generally opaque coating layer disposed so as to prevent viewing of the substrate or surface until the coating is reacted with a reducing fluid to render the coating layer transparent thereby revealing the substrate or surface layer. In one embodiment, the substrate or surface supports a colored layer, the colored layer being hidden by the coating until the coating is reacted and turned transparent thereby revealing the colored layer. In another embodiment, the substrate is a clear substrate, and the colored layer is disposed below the clear substrate and the coating layer is disposed atop the clear substrate. Moreover, in each case, when the coating layer is made transparent, the viewer sees the underlying surface or colored layer through the (now) transparent coating.

As noted above, the generally opaque coating is rendered transparent upon application of an eradicator fluid applied by a user of the system. In a preferred embodiment, the coating is a binder-based coating that is reduced (and thereby made transparent) by a reducing fluid applied by a user's marker. The reducing fluid "ink" applied by the marker in this embodiment reacts with the coating to render it colorless.

Once the eradicator fluid is applied to the coating and the reaction occurs, the hidden layer disposed below the coating appears to the user. This hidden layer substrate, discussed in more detail below, may be either a single color (or white) or a multi-colored design.

Figure 1:
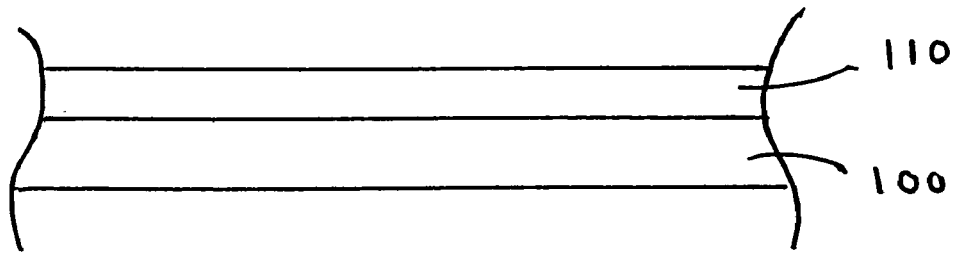
FIG. 1 illustrates one embodiment of the present invention where the substrate is the only layer hidden by a coating layer.

FIG. 1 shows an embodiment of the invention where only two layers are present. In this case, bottom layer 100 is covered by coating 110. Bottom layer 100 can be any suitable material, including, but not limited to, paper, plastic sheet, foil, ceramic, clay, or other porous and non-porous surfaces of any color or design. Bottom layer 100 may be white, metallic, colored or multi-colored, and/or have a design formed as a part thereof.

Figure 2:
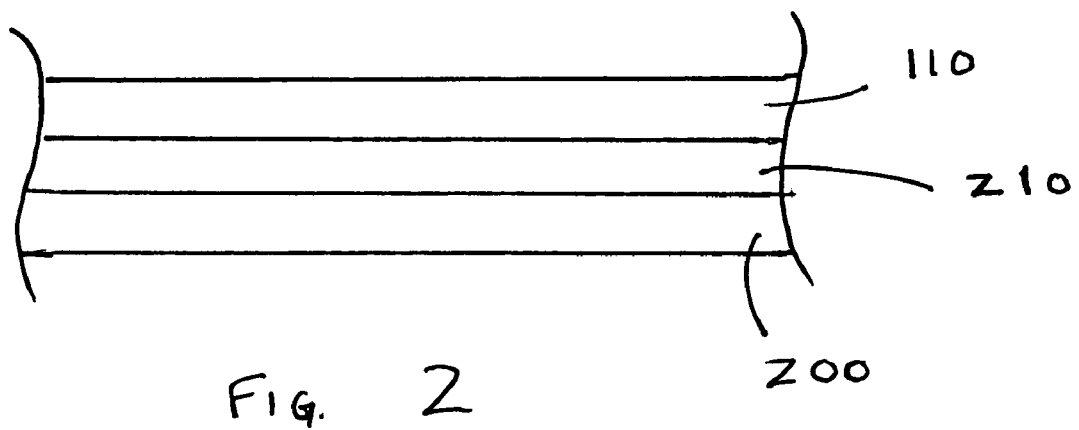
FIG. 2 illustrates a three-layered embodiment where the substrate supports a colored layer.

FIG. 2 shows a three-layered embodiment of the invention. The bottom layer is substrate 200, which can be of any suitable material, including, but not necessarily limited to, paper, plastic sheet, foil, ceramic, clay, or other porous and non-porous surfaces. Atop substrate 200 is a colored layer 210, which may be printed or otherwise applied to substrate 200. This layer can be a single color, but preferably is a printed design of some type. The embodiment of FIG. 2 is similar to that shown in FIG. 1, but colored layer 210 is printed or otherwise applied to the top of substrate 200 and the two layers, though joined, are distinct from one another. Coating layer 110 is the same as that shown in FIG. 1.

As noted, coating layer 110 is generally opaque. Coating layer 110 is preferably a water-based coating composition comprised of (in addition to water when it is first applied to the substrate) a coloring agent which is an acid or basic dye, a resin which has solubility or dispersability in water (for example polyethylene oxide, polyvinyl alcohol and its copolymers, polyvinyl acetate, polyvinyl pyrrolidone, starches, acrylic resins and its copolymers, polyurethane, sulfopolyester resins, styrene-butadiene resin (SBR), polyethylene glycol, or any copolymer that contains one or more such compounds, such as ethylene vinyl chloride copolymer, vinyl acetate copolymer, vinyl acrylic copolymer), and additives (such as preservatives, freeze/thaw stabilizers, etc.).

The dyes used in coating layer 110 can be any of a number of dyes, including acid violet, acid blue, acid green, basic yellow, and basic red, and others. A preferred list of suitable dyes include especially acid violet 19, acid blue 93, acid green 3, basic yellow 49, basic red 14, basic blue 69, and basic green 4. In one embodiment of the invention, combinations of these dyes are used to form a dark or black opaque coating. It should be noted, however, that the coating layer need not be black or even dark, so long as adequate opacity is achieved to hide the hidden layer. For example, an opaque yellow layer could be used.

In general, opacity for coating layer 110 is defined in accordance with ASTM Standard D2805, which sets forth the Standard Test Method for Hiding Power of a coating through reflectometry. Although complete opacity is not necessary, a minimum opacity is 40%, preferably at least 50%, more preferably at least 80%, and most preferably at least 90%.

When coating layer 110 is contacted with a reducing agent, the opaque coating reacts and becomes colorless, thereby revealing to the user of the system the layer disposed below (which is either bottom layer 100 in FIG. 1 or colored layer 210 in FIG. 2). The reducing agent is also preferably water based and can be stored in the form of a marker, paint (and applied, for example, by finger or brush), crayon, pen, or other applicator. The water-based reducing fluid, or "ink," composition is generally comprised of (in addition to water) a reducing agent such as sodium sulfite, sodium metabisulfite, or amines, a co-reducing agent such as sodium carbonate, potassium carbonate, sodium phosphate, or potassium phosphate, a pH adjuster such as sodium hydroxide, and additives.

A suitable opaque coating for application to the substrate includes 20-80 wt % solvent, preferably water (when applied), an optional defoamer at 0-3 wt %, an optional surfactant at 0-3 wt %, an optional wetting agent at 0-5 wt %, a colorant at 1-25 wt % colorant, a binder resin at 1-60 wt %, and a preservative at 0-4 wt %. Once dry, the suitable coating composition is comprised of 0-3 wt % defoamer, 0-3 wt % defoamer, 0-3 wt % surfactant, 0-10 wt % wetting agent, 1-80 wt % colorant(s), 10-90 wt % resin, and 0-4 wt % preservatives. A preferred coating comprises, when dry, 0-3 wt % defoamer, 0-3 wt % defoamer, 0-3 wt % surfactant, 0-10 wt % wetting agent, 6-55 wt % colorant(s), 30-80 wt % resin, and 0.02-4 wt % preservatives.

Suitable defoamers include mineral oils, silicas, surfactants and silicon dioxide. An exemplary defoamer is Drewplus L493 (Drewplus is a registered trademark of Ashland Inc., of Covington Ky. for defoamers) and a preferred amount of the defoamer is 0-1 wt % in the composition as applied (0-3 wt % of the dried coating).

Suitable surfactants include polyethylene glycol mon(4-(1, 1,3,3-tetramethylbutyl)phenyl) ether and octylphenoxypolyethoxyethanol. Preferred surfactants are alkylaryl polyether alcohols, such as Triton X-100 surfactant (Triton is a registered trademark of Rohm & Haas Company of Philadelphia) and Dowfax surfactant (Dowfax is a registered trademark of Dow Chemical Co. of Midland Mich. for surface active agents). A preferred amount of the surfactant is up to 1 wt % in the composition applied (0-3 wt % of the dried coating).

Suitable wetting agents include 2,5,8,11-tetramethyl-6-dodecyn-5,8-diol ethoxylate. A preferred wetting agent is Dynol 604 (Dynol is a trademark of Air Products & Chemicals, Inc. of Allentown, Pa.). A preferred amount of wetting agent is up to 5 wt % of the composition applied (up to 10 wt % of the dried coating).

A preferred colorant for the coating layer is actually a combination of acid violet 19 and acid green 3, present at 2 wt % and 10 wt %, respectively, of the composition as applied. As noted above, however, other dyes can be used, so long as adequate opacity is achieved. Generally, 1-25 wt % of the composition applied should be colorant. Of the dried coating, the colorant should comprise between 1 and 80 wt % of the coating, and preferably between 6 and 55 wt % of the coating.

Preferred resins include styrene acrylic, polyethylene oxide, and polyvinyl alcohol (PVOH). The preferred resin is polyvinyl alcohol, such as Celvol (Celvol is a registered trademark of Celanese International Corporation of Dallas, Tex.) present in an amount up to 60 wt %, preferably 40-55 wt % of the composition applied. Of the dried coating, the colorant should comprise between 10 and 90 wt % of the coating, and preferably between 30 and 80 wt % of the coating.

Exemplary preservatives are known to those skilled in the art, such as Kathon (Kathon is a registered trademark of Rohm & Haas Company of Philadelphia, Pa. for fungicides and biocides) and Nuosept 95 (Nuosept is a registered trademark of Huls America Inc. of Somerset, N.J. for biocidal and bactericidal compositions). A preferred amount of preservative ranges from 0.1 wt % to 0.3 wt % of the composition applied.

An exemplary reducing fluid includes 30-99 wt % solvent, 0-60 wt % pH adjuster, 0.5-30 wt % reducing agent, an optional surfactant up to and including 30 wt %, and 0-20 wt % buffer. A preferred reducing fluid comprises 30-95 wt % water, 1-5 wt % pH adjuster, 5-15 wt % reducing agent, 0-5 wt % surfactant, and 2-10 wt % buffer/co-reducing agent. Suitable reducing agents include sodium sulfite ($Na_2SO_3$), potassium sulfite ($K_2SO_3$), sodium bisulfite ($NaHSO_3$), sodium dithionite (sodium hydrosulfite) ($Na_2S_2O_4$ and $Na_2S_2O_4.2H_2O$), sodium formaldehyde sulphoxylate ($NaHSO_2.CH_2O.2H_2O$ (or $H_2O$)), or zinc formaldehyde sulphoxylate ($Zn(HSO_2.CH_2O)_2$). Preferred reducing agents include sodium sulfite, potassium sulfite, or combinations thereof. A preferred reducing agent is sodium sulfite present at 11 wt %. A preferred pH adjuster is sodium hydroxide present at 1-3 wt %. As above, exemplary surfactants include Triton X-100 surfactant and Dowfax surfactant, present up to 30 wt %.

In a preferred embodiment, the reducing fluid, in addition to having the reducing agent defined above, includes a buffer which is essentially a co-reducing agent (an additional reducing agent) selected from sodium carbonate, potassium carbonate, sodium bicarbonate, potassium bicarbonate, and combinations thereof. The co-reducing agent/buffer is preferably present in the range of from 1-20 wt %, and more preferably at about 3-10 wt %, most preferably about 6 wt %.

It is preferable that the opaque coating layer have a low pH, specifically one below 7, and more preferably a pH of between 3 and 5. A most preferred pH is about 4.5. The eradicator fluid preferably has a higher pH, such as greater than 7. A preferred pH of the eradicator fluid is from 8 to 14, and most preferably is from 12 to 13, inclusive.

Figure 3:
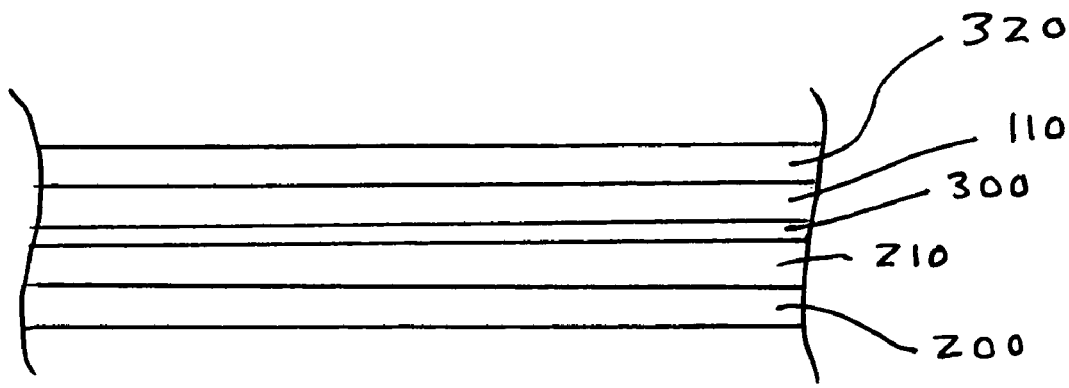
FIG. 3 illustrates an embodiment of the invention including additional, optional layers between the colored layer and coating layer, and also on top of the coating layer.

FIG. 3 shows an embodiment of a layered product which is a part of the system of the present invention. In this embodiment, several optional layers are included. In this case, a barrier layer 300 is provided between the colored design (in this case a separate colored layer, colored layer 210) and coating layer 110. Barrier layer 300 is present in this embodiment to protect the colored design from reaction with the eradicator fluid (reducing fluid). This layer is especially important if colored layer 210 is not particularly alkali resistant. The greater the degree of alkali resistance possessed by the colored layer, the less the need for barrier layer 300. A preferred barrier layer 300 is comprised of a varnish, such as Bond-Plus (which is a trademark of Industrial Adhesive Co. of Chicago, Ill.). The purpose, moreover, of the barrier layer is to provide protection of the hidden layer from reaction with the eradicator fluid.

FIG. 3 also shows top coat 320. Optional top coat 320 is present atop coating 110 to prevent smudging, removal, or other unwanted transfer of the coating. This prevention of transfer is especially desirous with respect to keeping a user's fingers free of smudges. Top coat 320 is preferably clear, although it can also have a degree of opacity. If a top coat 320 is used, it is important that it have adequate solubility in the eradicator fluid to allow the eradicator fluid to reach, and thereby react with, coating 110. A preferred top coat is a resin layer comprised of polyethylene oxide copolymer or polyvinyl alcohol. A preferred composition for use in the laydown of top coat 320 is comprised of water (present from 10 wt % to 70 wt %), 20-90 wt % resin, such as polyethylene oxide or polyvinyl alcohol, and optionally up to about 5 wt % wetting agent and up to 4 wt % preservatives. On a dry weight basis, a suitable top coat is comprised of 50-100 wt % resin, 0-20 wt % wetting agent, and 0-4 wt % preservatives. A preferred top coat, when dry, would comprise 85-95 wt % resin, 5-10 wt % wetting agent, and 0.2-2 wt % preservatives.

Figure 4:
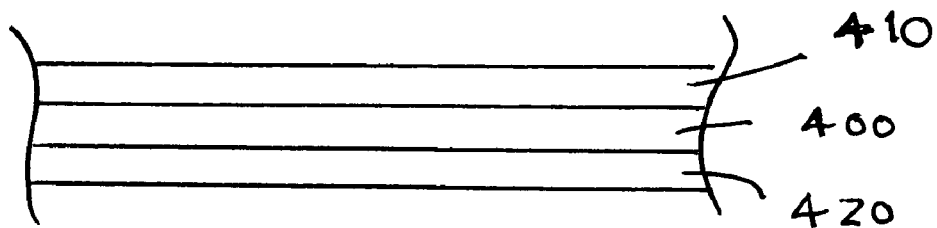
FIG. 4 illustrates an embodiment of the invention where the substrate is transparent and the coating and colored layer are on opposite sides of the substrate.

FIG. 4 shows an embodiment of the invention noted above where the colored layer is disposed on a side of the substrate opposite the coating. In this case, the substrate itself is clear and therefore the colored layer can be viewed by the user through the coating and substrate after the eradicator fluid is applied to the coating to render it transparent. Specifically, clear substrate 400 has on its upper side coating layer 410 and on its lower side colored layer 420. As above, a top coat can optionally be applied to the top of coating 410. In this embodiment, however, there would be no need for a separate barrier layer because the colored layer is already separated from any eradicator fluid upon its application because of clear substrate 400.

As noted above, the coating is preferably dry when it is eradicated by the reducing fluid. In a preferred embodiment, the coating is applied wet by a manufacturer of the system and the coated, dry substrate system is provided (or sold) to a user with a suitable reducing fluid delivery component, such as a marker. The user then has the coated substrate on which to apply or write with the marker and remove the opacity to view what is underneath. In an alternative embodiment, the system could be provided to a user in at least three parts, namely a colored substrate, a container of the wet coating, and a suitable reducing fluid delivery component. In this embodiment, the user would apply the coating wet, such as with a paintbrush or other suitable delivery means (e.g., fingers or cotton swab) and allow it to dry before then applying the reducing fluid as above. In this latter embodiment, a preferred system would include a bottle or jar of wet coating (in solution), a substrate, and a reducing fluid marker.

EXAMPLE

The following example is provided as an exemplary embodiment of the coating layer before it is applied. The amounts shown are in weight %.

| Ingredient | |
| --- | --- |
| Water | 40-55 |
| Defoamer | 0.1-1 |
| Surfactant | 0.2-1 |
| Wetting Agent | 1-3 |
| Acid Violet 19 | 1-3 |
| Acid Green 3 | 8-12 |
| PVOH (24% aqueous soln.) | 30-50 |
| Kathon LX | 0.05-0.3 |
| Nuosept 95 | 0.2-0.5 |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for hiding and later revealing a hidden colored layer, said system comprising:
   a substrate including said hidden colored layer;
   an opaque coating comprising a resin covering said hidden colored layer; and
   a reducing fluid;
   said coating reactive with a reducing agent in said reducing fluid to render said coating transparent and to reveal said hidden layer.

2. The system of claim 1 wherein said coating when dry has an opacity greater than 40%.

3. The system of claim 1 wherein said coating on a dry basis comprises:
0-3 wt % defoamer;
0-3 wt % surfactant;
0-10 wt % wetting agent;
1-80 wt % colorant; and
10-90 wt % resin.

4. The system of claim 1 wherein said coating on a wet basis comprises:
20-80 wt % solvent;
0-3 wt % defoamer;
0-3 wt % surfactant;
0-5 wt % wetting agent;
1-25 wt % colorant; and
1-60 wt % resin.

5. The system of claim 1 wherein said reducing fluid comprises:
30-99 wt % solvent;
0-60 wt % pH adjuster;
0.5-30 wt % reducing agent;
0-30 wt % surfactant; and
0-20 wt % buffer.

6. The system of claim 1 further comprising a colored layer disposed on said substrate including said hidden layer, and said coating is disposed atop said colored layer.

7. A system for hiding and later revealing a hidden layer, said system comprising:
a substrate;
a colored layer disposed on said substrate,
an opaque coating covering said colored layer;
a barrier layer between said colored layer and said coating; and
a reducing fluid;
said coating reactive with a reducing agent in said reducing fluid to render said coating transparent and to reveal said colored layer.

8. The system of claim 1 wherein said coating is disposed on said substrate, and a top coat layer is disposed on said coating, said top coat layer comprising:
50-100 wt % resin;
0-20 wt % wetting agent;
0-4 wt % preservatives.

9. The system of claim 3 wherein said resin in said coating is selected from the group consisting of polyethylene oxide, polyvinyl alcohol, polyvinyl acetate, polyvinyl pyrrolidone, starch, acrylic resin, polyurethane, sulfopolyester resin, styrene-butadiene resin, polyethylene glycol, and combinations thereof.

10. The system of claim 8 wherein said resin of said top coat layer is selected from the group consisting of polyethylene oxide copolymer, polyvinyl alcohol, and combinations thereof.

11. The system of claim 5 wherein said buffer of said reducing fluid is selected from the group consisting of sodium carbonate, potassium carbonate, sodium bicarbonate, potassium bicarbonate, and combinations thereof.

12. The system of claim 5 wherein said pH adjuster of said reducing fluid is sodium hydroxide.

13. The system of claim 5 wherein said reducing agent of said reducing fluid is selected from the group consisting of sodium sulfite, potassium sulfite, and combinations thereof.

14. The system of claim 3 wherein said colorant in said coating is a combination of acid violet 19 and acid green 3.

15. The system of claim 5 wherein said pH adjuster in said reducing fluid is sufficient to keep the pH of said eradicator fluid above 10.

16. The system of claim 6 wherein said colored layer is comprised of a design of at least two different colors.

17. The system of claim 1 wherein said substrate is clear and said system further comprises a colored layer disposed on said substrate on a side of said substrate opposite said coating.

18. An art material system comprising, in combination:
a layered writing surface; said layered writing surface comprising:
a substrate,
a colored layer disposed on said substrate, and
a generally opaque coating comprising a resin disposed on one of said substrate or said colored layer and covering at least part of said colored layer, said coating reactive with an eradicator fluid whereby said coating becomes clear after reaction with said eradicator fluid revealing said hidden layer; and
an applicator for dispensing a reducing fluid, said reducing fluid comprising:
30-95 wt % water;
2-20 wt % pH adjuster to keep the pH above 10;
2-25 wt % reducing agent;
0-30 wt % surfactant; and
0.1-20 wt % buffer.

19. The system of claim 18 wherein said generally opaque coating in a dry basis comprises:
0-3 wt % defoamer;
0-3 wt % surfactant;
0-10 wt % wetting agent;
1-80 wt % colorant; and
10-90 wt % resin.

20. The system of claim 18 wherein said generally opaque coating on a wet basis comprises:
20-80 wt % solvent;
0-3 wt % defoamer;
0-3 wt % surfactant;
0-5 wt % wetting agent;
1-25 wt % colorant; and
1-60 wt % resin.

21. The system of claim 18 further comprising:
a barrier layer between said colored layer and said generally opaque coating.

22. The system of claim 18 further comprising a top coat layer disposed on said generally opaque coating, said top coat layer comprising:
50-100 wt % resin;
0-20 wt % wetting agent;
0-4 wt % preservatives.

23. The system of claim 18 wherein said resin in said generally opaque coating is polyvinyl alcohol, polyvinyl acetate, polyvinyl pyrrolidone, starch, acrylic resin, and combinations thereof.

24. The system of claim 22 wherein said resin of said top coat layer is polyethylene oxide copolymer, polyvinyl alcohol, and combinations thereof.

25. The system of claim 18 wherein said buffer of said reducing fluid is selected from the group consisting of sodium carbonate, potassium carbonate, sodium bicarbonate, potassium bicarbonate, and combinations thereof.

26. The system of claim 18 wherein said pH adjuster of said reducing fluid is sodium hydroxide.

27. The system of claim 18 wherein said reducing agent of said reducing fluid is selected from the group consisting of sodium sulfite, potassium sulfite, and combinations thereof.

28. The system of claim 19 wherein said colorant in said generally opaque coating is a combination of acid violet 19 and acid green 3.

29. The system of claim 18 wherein said pH adjuster in said reducing fluid is sufficient to keep the pH of said eradicator fluid above 8.

30. The system of claim 18 wherein said colored layer is comprised of a design of at least two different colors.

31. A system for hiding and later revealing a hidden colored layer, said system comprising:

a substrate including said hidden colored layer;

an opaque coating covering said hidden colored layer, wherein said coating is disposed on said substrate;

a top coat layer disposed on said coating; and a reducing fluid;

said coating reactive with a reducing agent in said reducing fluid to render said coating transparent and to reveal said hidden colored layer.

\* \* \* \* \*